US009305043B2

(12) United States Patent
Sakurai et al.

(10) Patent No.: US 9,305,043 B2
(45) Date of Patent: Apr. 5, 2016

(54) STREAM DATA ANOMALY DETECTION METHOD AND DEVICE

(75) Inventors: Takao Sakurai, Tokyo (JP); Tomohiro Hanai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 224 days.

(21) Appl. No.: 14/003,563

(22) PCT Filed: Sep. 12, 2011

(86) PCT No.: PCT/JP2011/070748
§ 371 (c)(1),
(2), (4) Date: Sep. 6, 2013

(87) PCT Pub. No.: WO2013/038473
PCT Pub. Date: Mar. 21, 2013

(65) Prior Publication Data
US 2013/0346417 A1    Dec. 26, 2013

(51) Int. Cl.
*G06F 17/30* (2006.01)
*H04L 1/20* (2006.01)

(52) U.S. Cl.
CPC .... *G06F 17/30336* (2013.01); *G06F 17/30321* (2013.01); *G06F 17/30613* (2013.01); *G06F 17/30864* (2013.01); *H04L 1/20* (2013.01)

(58) Field of Classification Search
CPC .................. G06F 17/30336; G06F 17/30864; G06F 17/30321; G06F 17/30613; G06F 17/30961; G06F 17/30067
USPC .......................................................... 707/741
See application file for complete search history.

(56) References Cited

U.S. PATENT DOCUMENTS

| | | | |
|---|---|---|---|
| 7,716,224 B2 * | 5/2010 | Reztlaff et al. ................ 707/741 |
| 7,979,439 B1 * | 7/2011 | Nordstrom et al. ........... 707/741 |
| 8,195,664 B2 * | 6/2012 | Lanxner et al. ................ 707/737 |
| 2003/0172302 A1 * | 9/2003 | Judge et al. ..................... 713/201 |
| 2005/0143976 A1 * | 6/2005 | Steniford ................ G10L 25/69 704/202 |
| 2005/0234920 A1 * | 10/2005 | Rhodes ............................ 707/10 |
| 2006/0161592 A1 * | 7/2006 | Ertoz et al. ..................... 707/200 |
| 2006/0294095 A1 * | 12/2006 | Berk et al. ......................... 707/6 |
| 2009/0083855 A1 * | 3/2009 | Apap ..................... G06F 21/552 726/24 |
| 2010/0064368 A1 * | 3/2010 | Stolfo ................... G06F 21/564 726/24 |
| 2010/0198830 A1 * | 8/2010 | Stewart et al. ................ 707/741 |
| 2012/0246169 A1 * | 9/2012 | Liu et al. ....................... 707/741 |

FOREIGN PATENT DOCUMENTS

| | | | |
|---|---|---|---|
| JP | 2000-194962 A | 7/2000 |
| JP | 2004-304689 A | 10/2004 |

(Continued)

*Primary Examiner* — Pierre Vital
*Assistant Examiner* — Andrew N Ho
(74) *Attorney, Agent, or Firm* — Mattingly & Malur, P.C.

(57) ABSTRACT

The present invention is a stream data anomaly detection method for detecting an anomaly in input data received by a computer. The computer has: an input module for receiving the input data; an anomaly detection unit for detecting an anomaly in the input data; and an index management unit for calculating an index for the detection of an anomaly in the input data. The anomaly detection unit compares the received input data with the index and detects an anomaly in the input data when the difference between the value of the input data and the index satisfies a predetermined condition. The index management unit determines whether or not the index should be recalculated, and, when the index is determined to be recalculated, the index management unit recalculates a new index on the basis of the input data and substitutes the index with the calculated index.

10 Claims, 16 Drawing Sheets

(56) References Cited

FOREIGN PATENT DOCUMENTS

| | | |
|---|---|---|
| JP | 2008-154010 A | 7/2008 |
| JP | 2009-199289 A | 9/2009 |
| JP | 2010-206486 A | 9/2010 |
| WO | 2010/100991 A1 | 9/2010 |

* cited by examiner

500

| DATA AMOUNT (501) | PROCESSING TIME (msec) (502) | |
|---|---|---|
| 10 | 1 | 511 |
| 20 | 2 | 512 |
| 30 | 3 | 513 |
| 40 | 6 | 514 |
| 50 | 10 | 515 |

*FIG. 5A*

| INDEX # (520) | ARITHMETIC OPERATION TIME (521) | |
|---|---|---|
| a | 3msec | 530 |

*FIG. 5B*

| 501 | 541 | 542 | 543 | 544 | 545 | 546 |
|---|---|---|---|---|---|---|
| DATA AMOUNT | 0 TIMES | ONCE | TWICE | 3 TIMES | 4 TIMES | 5 TIMES |
| 10 | 1 | 4 | 7 | 10 | 13 | 16 |
| 20 | 2 | 5 | 8 | 11 | 14 | 17 |
| 30 | 3 | 6 | 9 | 12 | 15 | 18 |
| 40 | 6 | 9 | 12 | 15 | 18 | 21 |
| 50 | 10 | 13 | 16 | 19 | 22 | 25 |

| 551 | 552 |
|---|---|
| DATA AMOUNT | REQUEST PROCESSING TIME |
| 10 | 8msec |

FIG. 5D

| NUMBER i OF PIECES OF DATA AFTER INDEX CALCULATION | $\varepsilon\_i$ |
|---|---|
| 1 | 10.0 |
| 2 | 3.75 |
| 3 | 1.67 |
| 4 | 1.125 |
| 5~ | 0.5 |

*FIG. 8*

| i | xi | yi | |
|---|---|---|---|
| 1 | 2.8 | 4.9 | ~1010 |
| 2 | 0.2 | 1.1 | ~1011 |
| 3 | 2.4 | 4.1 | ~1012 |
| 4 | 5.7 | 9.1 | ~1013 |
| 5 | 2.7 | 5.6 | ~1014 |
| 6 | 3.1 | 4.4 | ~1015 |
| 7 | 3.0 | 4.9 | ~1016 |
| 8 | 3.4 | 5.6 | ~1017 |
| 9 | 2.5 | 5.0 | ~1018 |
| 10 | 3.1 | 4.5 | ~1019 |

FIG. 10A

| 1100 | 1101 | 1102 | 1103 | 1104 | 1105 | 1106 | 1107 | 1108 |
|---|---|---|---|---|---|---|---|---|
| # | xi-xave | yi-yave | Σ(xi-xave) | Σ(yi-yave) | \|Σv\| | RE CALCULATION | xave | yave |
| 1 | -0.2 | -0.1 | -0.2 | -0.1 | 0.22 | × | 3.0 | 5.0 |
| 2 | -2.8 | -3.9 | -3.0 | -4.0 | 5.00 | ○ | 2.7 | 4.6 |
| 3 | -0.3 | -0.5 | -0.3 | -0.5 | 0.58 | × | 2.7 | 4.6 |
| 4 | 3.0 | 5.0 | 2.7 | 4.5 | 5.24 | ○ | 2.9 | 4.9 |
| 5 | -0.2 | 0.7 | -0.2 | 0.7 | 0.78 | × | 2.9 | 4.9 |
| 6 | 0.2 | -0.5 | 0.0 | 0.2 | 0.20 | × | 2.9 | 4.9 |
| 7 | 0.1 | 0.0 | 0.1 | 0.2 | 0.22 | × | 2.9 | 4.9 |
| 8 | 0.5 | 0.7 | 0.6 | 0.9 | 1.08 | × | 2.9 | 4.9 |
| 9 | -0.4 | 0.1 | 0.2 | 1.0 | 1.02 | × | 2.9 | 4.9 |
| 10 | 0.2 | -0.4 | 0.4 | 0.6 | 0.72 | × | 2.9 | 4.9 |

Columns 1110–1119 correspond to rows 1–10.

| INDEX # | xave | yave |
|---|---|---|
| 1 | 1.0 | 3.0 |
| 2 | 1.5 | 2.8 |
| 3 | 2.0 | 3.1 |
| 4 | 3.0 | 5.0 |
| 5 | 5.0 | 3.0 |
| 6 | 4.0 | 1.0 |

| INDEX # | xave | yave | $|\Sigma v|$ |
|---|---|---|---|
| 1 | 1.0 | 3.0 | 11.15 |
| 2 | 1.5 | 2.8 | 13.57 |
| 3 | 2.0 | 3.1 | 11.05 |
| 4 | 3.0 | 5.0 | 0.58 |
| 5 | 5.0 | 3.0 | 14.71 |
| 6 | 4.0 | 1.0 | 21.17 |

| # | xi-xave | yi-yave | Σ(xi-xave) | Σ(yi-yave) | \|Σv\| | RE CALCULATION | xave | yave |
|---|---|---|---|---|---|---|---|---|
| 1 | -0.2 | -0.1 | -0.2 | -0.1 | 0.22 | × | 3.0 | 5.0 |
| 2 | -2.8 | -3.9 | -3.0 | -4.0 | 5.00 | ○ | 2.7 | 4.6 |
| 3 | -0.3 | -0.5 | -0.3 | -0.5 | 0.58 | × | 2.7 | 4.6 |
| 4 | 3.0 | 5.0 | 2.7 | 4.5 | 5.24 | ○ | 2.9 | 4.9 |
| 5 | -0.2 | 0.7 | -0.2 | 0.7 | 0.78 | × | 2.9 | 4.9 |
| 6 | 0.2 | -0.5 | 0.0 | 0.2 | 0.20 | × | 2.9 | 4.9 |
| 7 | 0.1 | 0.0 | 0.1 | 0.2 | 0.22 | × | 2.9 | 4.9 |
| 8 | 0.5 | 0.7 | 0.6 | 0.9 | 1.08 | × | 2.9 | 4.9 |
| 9 | -0.4 | 0.1 | 0.2 | 1.0 | 1.02 | ○ | 3.0 | 5.0 |
| 10 | 0.1 | -0.5 | 0.1 | -0.5 | 0.51 | × | 3.0 | 5.0 |

FIG. 14

STREAM DATA ANOMALY DETECTION METHOD AND DEVICE

BACKGROUND

This invention relates to a stream data processing system, and more particularly, to an anomaly detection technology and a performance guaranteeing technology that are used for stream data processing.

On a computer for executing stream data processing, pieces of continuously-received data are processed without interruption, and predetermined processing such as determination, complementation, prediction, or anomaly detection is performed. However, an abrupt increase in received data increases latency, and a real-time property desired by a user cannot be maintained.

Therefore, there is known a technology in which a plurality of modes of processing different in processing time and accuracy are provided in advance, and the mode of processing to be used is selected so as to satisfy the latency requested by the user depending on a data amount, to thereby reduce a whole arithmetic operation amount and maintain the real-time property (see Japanese Patent Application Laid-open No. 2010-206486).

Further, in the field of anomaly detection processing, there is known a technology for reducing the arithmetic operation amount by determining, each time data having a given fixed data amount arrives, whether or not an index used for anomaly detection needs to be recalculated based on an accumulating total of a distance between newly-arrived data and the index used so far (see Japanese Patent Application Laid-open No. 2009-199289).

SUMMARY

In the anomaly detection processing for stream data, in a case where the index (for example, principal component in a principal component analysis) used for detection is recalculated at each arrival of the data when the data increases, a massive arithmetic operation amount is necessary, and the real-time property of the stream data processing cannot be maintained.

Here, Japanese Patent Application Laid-open No. 2010-206486 has a precondition that selectable modes of processing all have an arithmetic operation time and the accuracy evaluated in advance, and has a problem of being unable to be applied to a case where the accuracy cannot be evaluated unless the arrived data is processed in actuality as in an anomaly detection technique.

Therefore, a consideration of applying a method of Japanese Patent Application Laid-open No. 2009-199289 to a real-time maintenance method of Japanese Patent Application Laid-open No. 2010-206486 raises a problem in that there is a fear that the real-time property of the stream data processing may not be maintained due to a recalculation count being too large because it is determined whether or not the recalculation of the index is necessary once every time a fixed number of pieces of data arrive and because a threshold value for calculating the index to be recalculated, which is used for the determination, is fixed. In other words, the determination for the recalculation of the index is performed every time the number of pieces of arrived data reaches the threshold value, and hence if the data amount of stream data rapidly increases, a computer resource is consumed for the recalculation of the index, resulting in a problem of an increase in the latency of the stream data processing.

An object of this invention is to solve the above-mentioned problems and to provide an anomaly detection method and a device therefore that are capable of executing an anomaly detection technique with high accuracy while maintaining a real-time property in stream data processing.

A representative aspect of this invention is as follows. An anomaly detection method for stream data, for detecting an anomaly from input data received by an interface on a computer, the computer comprising: a processor; a memory; the interface; an input module for receiving the input data; an anomaly detection module for detecting the anomaly from the input data; and an index management module for managing an index for detecting the anomaly from the input data, the anomaly detection method for stream data comprising: a first step of receiving, by the input module, the input data received by the interface; a second step of comparing, by the anomaly detection module, the received input data with the index, and when a difference between a value of the input data and the index satisfies a predetermined condition, detecting the anomaly from the input data; a third step of determining, by the index management module, whether or not to recalculate the index; and a fourth step of recalculating, by the index management module, a new index based on the input data when it is determined that the index is to be recalculated, and substituting the index by the calculated index, the third step comprising: a fifth step of calculating a maximum count of the recalculation of the index based on an amount of the unprocessed input data that is yet to be processed by the anomaly detection module among pieces of input data received by the input module, an arithmetic operation time required for the recalculation of the index, and a time constraint set in advance; a sixth step of calculating a predetermined threshold value corresponding to a number of pieces of input data received after the previous calculation of the index; a seventh step of calculating the difference between the value of the input data and the index; an eighth step of comparing the difference with the predetermined threshold value corresponding to the number of pieces of input data, determining that the predetermined threshold value is to be recalculated when the difference is larger than the predetermined threshold value, and executing processing for executing the recalculation of the index until the maximum count of the recalculation is reached; and a ninth step of substituting the index by the recalculated new index.

According to this invention, it is possible to dynamically change the timing to recalculate the index for anomaly detection depending on the amount of the input data and the time constraint. Accordingly, it is possible to provide the stream data processing technology exhibiting high accuracy of the anomaly detection for the input data while maintaining the real-time property in an entirety of a stream data processing system.

BRIEF DESCRIPTION OF THE DRAWINGS

FIG. 5A is a diagram illustrating an example of the time required for the processing of the anomaly detection module according to the first embodiment of this invention.

FIG. 5B is an example of the index calculation processing time necessary to recalculate the detection index according to the first embodiment of this invention.

FIG. 5C is the processing time table obtained by calculating the entire processing time according to the first embodiment of this invention.

FIG. 5D is an example of the requested information for setting a relationship between the data amount and the request processing time according to the first embodiment of this invention.

FIG. 8 is an example of a recalculation criterion calculated in the processing of FIG. 7 according to the first embodiment of this invention.

FIG. 10A shows an example of input data according to the first embodiment of this invention.

FIG. 10B shows the determination result of the recalculation, the detection index, and a midway result thereof that are output as a result that the index calculation determination module according to the first embodiment of this invention.

FIG. 13A is an example of the past index according to a second embodiment of this invention.

FIG. 13B is an example of a distance from the input data is obtained for each of the entries of the past index according to a second embodiment of this invention.

FIG. 14 shows the determination result of the recalculation according to a second embodiment of this invention.

DETAILED DESCRIPTION OF THE PREFERRED EMBODIMENTS

Figure 1:
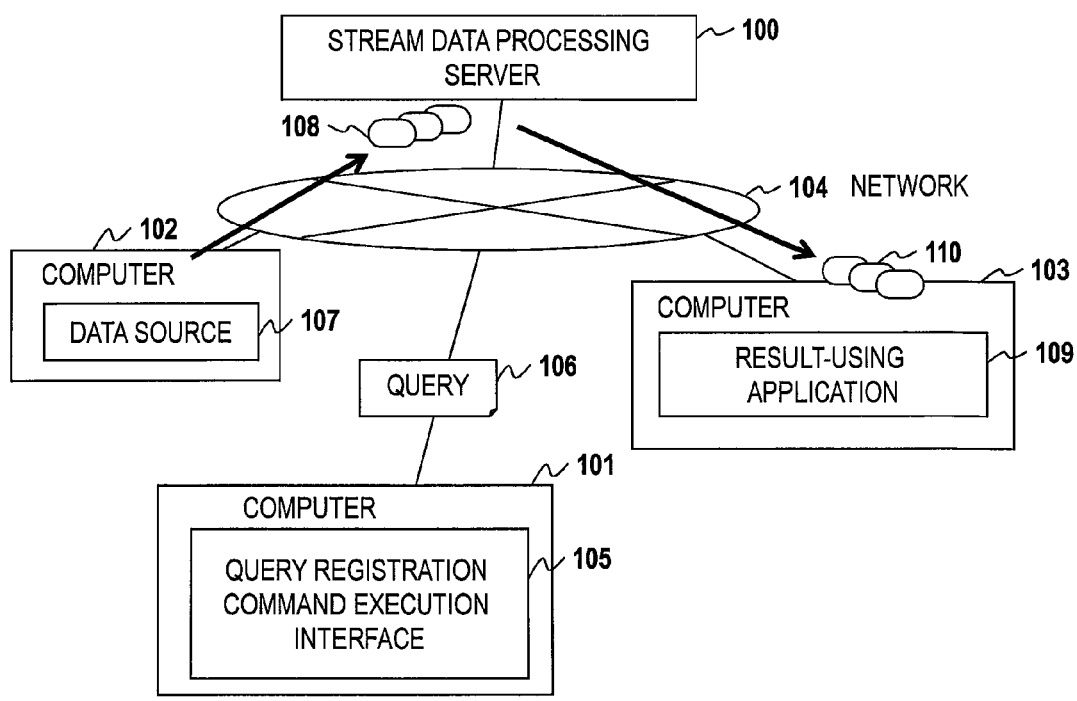
FIG. 1 is a block diagram illustrating an example of the computer system for performing the stream data processing according to a first embodiment of this invention.

Now, embodiments of this invention are described in detail with reference to the accompanying drawings. It should be noted that in all the drawings for illustrating the embodiments, the same members are denoted by the same reference numerals in principle, and the same descriptions of the same reference numerals are omitted. Further, in the embodiments, a program executed by a computer or the like that forms a processing server for executing stream data processing, in other words, query processing for input stream data is referred to also as "function", "means", "module", or the like. For example, a function of an execution mode determination program is referred to also as "execution mode determination function", "execution mode determination means", "execution mode determination module", or the like.

First Embodiment

Figure 2:
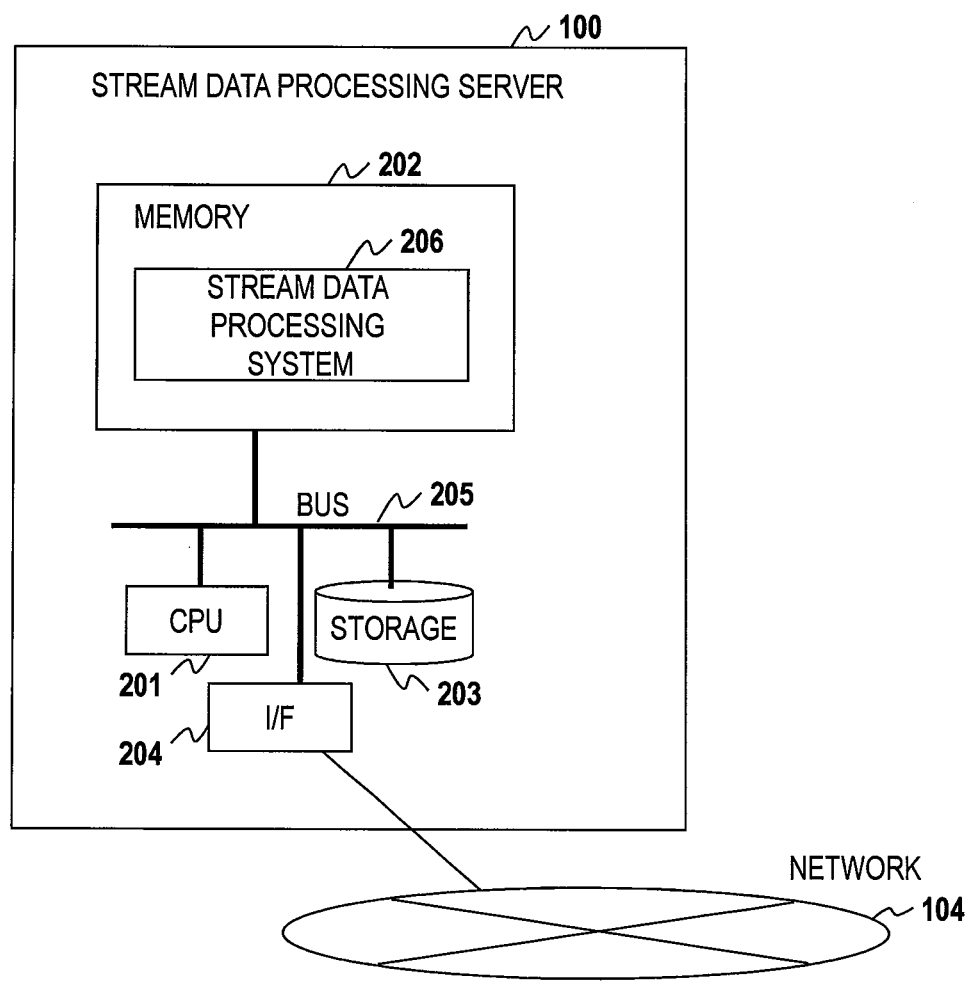
FIG. 2 is a block diagram illustrating an example of the stream data processing server according to the first embodiment of this invention.

First, with reference to FIG. 1 and FIG. 2, a basic configuration of a computer system for executing stream data processing according to a first embodiment of the present invention is described.

FIG. 1 is a block diagram illustrating an example of the computer system for performing the stream data processing. As illustrated in FIG. 1, in the computer system for executing the stream data processing, a stream data processing server 100 and computers 101, 102, and 103 are coupled to a network 104. The stream data processing server 100 receives data 108 from the computer 102 for outputting a data source 107 via the network 104. An execution result 110 processed on the stream data processing server 100 is transmitted to a result-using application 109 on the computer 103.

Further, on the computer 101, a query registration command execution interface 105 is executed in order to register a query for executing the stream data processing in the stream data processing server 100. Arbitrarily-selected two or three of those computers 101, 102, and 103 can be formed by one computer or can be integrated into the stream data processing server 100.

FIG. 2 is a block diagram illustrating an example of the stream data processing server 100. As illustrated in FIG. 2, the stream data processing server 100 includes a memory 202 being a storage unit, a central processing unit (CPU) 201 being a processing unit, a network interface (I/F) 204, a storage 203 being a storage device, and a bus 205 for coupling those components to one another. A stream data processing system 206 for defining contents of the stream data processing is stored on the memory 202. The stream data processing system 206 is an executable image that can be interpreted and executed by the CPU 201 as described later in detail.

As illustrated in FIG. 2, the computer that forms the stream data processing server 100 is coupled to the external network 104 via the network interface 204 being an interface unit. It should be noted that the number of computers that form the stream data processing server 100 may be at least two instead of one, but the description is made here referring to the drawing illustrating a configuration of one computer.

The stream data processing server 100 receives a query 106 (see FIG. 1) defined by a user via the query registration command execution interface 105 executed on the computer 101 coupled to the network 104. The stream data processing system 206 of the stream data processing server 100 forms inside itself a query graph that can execute the stream data processing based on the definition of the query 106. After that, the stream data processing server 100 receives the data 108 transmitted by the data source 107 executed on the computer 102 coupled to the network 104. The stream data processing server 100 processes the data based on the internal query graph, generates the execution result (output data) 110, and transmits the execution result 110 to the result-using application 109 executed on the computer 103.

The storage 203 holds the query 106 received once in addition to the stream data processing system 206. The stream data processing system 206 can also load the definition of the query 106 from the storage 203 at boot to form the query graph.

The configuration of the stream data processing server according to this embodiment described here is merely an example. The number of computers does not need to be one, and the stream data processing server according to this embodiment may be formed of a plurality of computers. The CPU 201 being the processing unit of the computer may be formed of two processors on the same computer, and in addition, the two processors may be two calculation cores within one multi-core CPU. In this specification, the server may adopt any configuration that includes at least the processing unit, the storage unit, and the interface unit.

Figure 3:
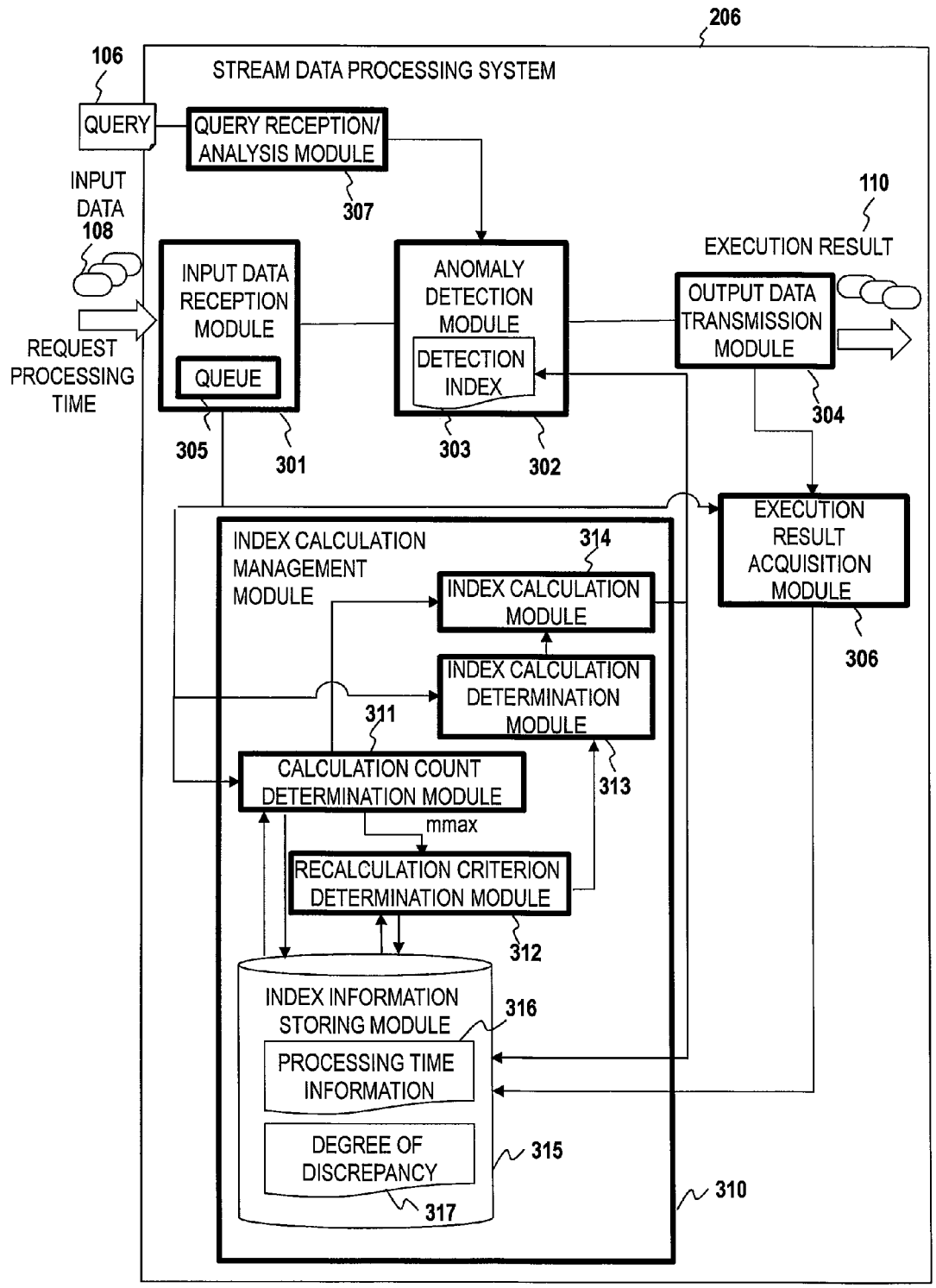
FIG. 3 is a block diagram illustrating functional components of the stream data processing system according to the first embodiment of this invention.

FIG. 3 is a block diagram illustrating functional components of the stream data processing system according to the embodiment of this invention.

FIG. 3 is a diagram illustrating a functional block configuration of software for executing an anomaly detection method for the stream data processing system according to the first embodiment. It should be noted that in the figure, the thick blocks indicate functions of various kinds of software executed by the CPU 201 being the processing unit of the stream data processing server 100. Further, in the figure, the thin blocks schematically indicate areas for holding various kinds of data retained on the memory 202 or the like when the software is executed.

In FIG. 3, the stream data processing system 206 includes an input data reception module 301 for receiving the input data 108, a query reception/analysis module 307 for receiving the query 106 in which details of anomaly detection are described, an anomaly detection module 302 for detecting an anomaly described in the query 106 from the input data 108, and an output data transmission module 304 for outputting the execution result 110 of the anomaly detection from the I/F 204 to the network 104.

It should be noted that in this specification, for the sake of convenience, the input data reception module 301 and the output data transmission module 304 are sometimes referred to collectively as "interface module". The interface module may be the same as the interface unit illustrated in FIG. 2, but is not necessarily the same, and the interface module may preferably be a functional interface module of the stream data processing system 206 itself executed on the stream data processing server 100.

Here, the anomaly detection module 302 retains a detection index 303 used to detect the anomaly from the input data 108. Further, a queue 305 retains data that has been input by the input data reception module 301 and has not yet been processed by the stream data processing system 206.

In addition, the stream data processing system 206 includes: an execution result acquisition module 306 for acquiring an amount of the input data 108 received by the input data reception module 301, a received time thereof, a request processing time, an amount of unprocessed data accumulated in the queue 305, and a time at which the output data transmission module 304 transmits the execution result 110; and an index calculation management module 310 for managing calculation of the detection index 303. It should be noted that the amount of the unprocessed data retained in the queue 305 can be obtained as a size of the input data 108 retained in the queue 305 or a number of pieces of input data 108.

Here, the index calculation management module 310 includes an index information storing module 315 for holding: processing time information 316 for retaining, from the execution result acquisition module 306, a processing time for the anomaly detection module 302 for each amount of the input data 108 and a processing time required to calculate the detection index 303; and a degree of discrepancy 317 being statistical information on a distance of data that arrives after the calculation of the detection index 303. Further, the index calculation management module 310 includes a calculation count determination module 311 for determining a calculation-enabled count of the detection index 303 based on the current size of the queue 305 and the processing time information 316. In addition, the index calculation management module 310 includes: a recalculation criterion determination module 312 for determining a criterion for recalculating the detection index 303 based on the size of the queue 305, the calculation-enabled count, and the degree of discrepancy 317; an index calculation determination module 313 for measuring the distance between the input data 108 and the current detection index 303 in accordance with a recalculation criterion, to determine whether or not to perform recalculation; and an index calculation module 314 for calculating the detection index 303 based on a determination result from the index calculation determination module 313.

The CPU 201 illustrated in FIG. 2 operates based on programs of the respective function modules constituting the stream data processing system 206, thereby operating as function modules that implement given functions. For instance, the CPU 201 functions as the anomaly detection module 302 when executing processing based on an anomaly detection program. The same also applies to other programs. The CPU 201 also operates as function modules that implement a plurality of processing procedures executed by the respective programs. The computers and the computer system are devices and system that include these function modules.

Programs, tables, and other types of information used to implement the respective functions of the stream data processing system 206 can be stored in a storage device such as the storage 203, a non-volatile semiconductor memory, a hard disk drive, or a solid state drive (SSD), or in a non-transitory computer-readable storage medium such as an IC card, an SD card, or a DVD.

Figure 4:
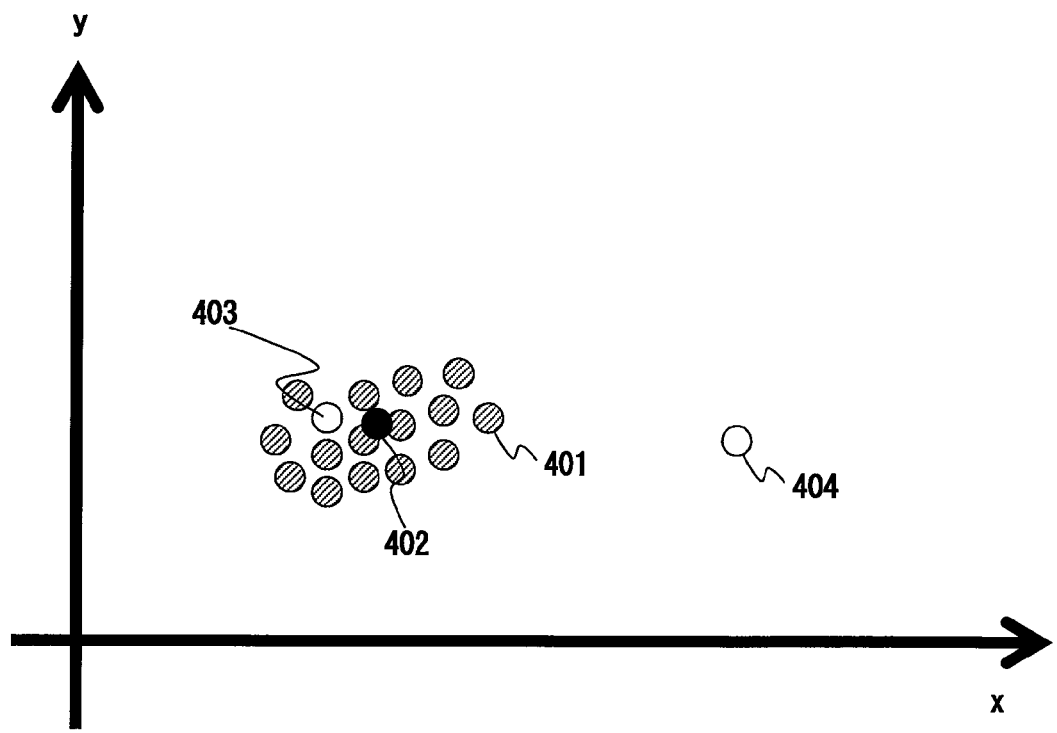
FIG. 4 is an explanatory diagram illustrating an anomaly detection technique according to the first embodiment of this invention.

Next, with reference to FIG. 4, a description is made of an example of an anomaly detection technique performed by the anomaly detection module 302 of the stream data processing system 206 according to this embodiment. In FIG. 4, values of a plurality of pieces of input data 108 are indicated as points 401 to 404 on a plane having two axes of an X-axis and a Y-axis. Of those, hatched points (for example, points 401) are points indicating the values of the pieces of input data 108 used to calculate the detection index 303. The black point 402 is a mean value of all the hatched points, and becomes the detection index 303 calculated from the plurality of pieces of input data 108.

Further, the points 403 and 404 are the pieces of input data 108 that newly arrive at the stream data processing server 100 after the detection index 303 is calculated. At this time, the stream data processing system 206 does not determine that the point 403 being newly-input data exhibits an anomaly because a Euclidean distance thereof from the point 402 being the detection index 303 is short. In other words, if the Euclidean distance between the point 403 of the input data and the point 402 of the detection index is equal to or smaller than a predetermined anomaly determination threshold value, the anomaly detection module of the stream data processing system 206 determines that the point 403 indicates normal input data.

On the other hand, the anomaly detection module 302 of the stream data processing system 206 determines that the point 404 being newly-input data exhibits an anomaly because a Euclidean distance thereof from the point 402 being the detection index is long. In other words, if the Euclidean distance between the point 404 of the newly-input data and the point 402 of the detection index exceeds the predetermined anomaly determination threshold value, the anomaly detection module 302 of the stream data processing system 206 determines that the value of the newly-input data 108 of the point 404 is anomalous.

Here, processing for calculating the detection index 303 for detecting the anomaly from the input data 108 is processing for calculating the mean value of the input data 108 at predefined N points in the past (for example, N=10). In this manner, the anomaly detection module 302 detects that the input data 108 is anomalous if the distance between the detection index 303 and the value of the input data 108 exceeds the anomaly determination threshold value. When detecting the anomaly from the input data 108, the anomaly detection module 302 outputs the execution result 110 indicating that the anomaly has been detected from the input data 108 to the output data transmission module 304.

It should be noted that in this embodiment, a description is made of an example in which the anomaly detection module 302 detects an anomaly from the input data 108 by comparing the Euclidean distance between the input data 108 and the detection index 303 and the predetermined anomaly determination threshold value, but it suffices that the anomaly detection module 302 detects the anomaly from the input data 108 when a difference between the value of the input data 108 and the detection index 303 satisfies a predetermined condition, and this invention is not limited to the anomaly detection technique illustrated in FIG. 4.

Further, an example in which the execution result 110 is transmitted to an external computer after the anomaly is detected from the input data 108 is described above, but in a case where the stream data processing server 100 includes an output device, an execution result may be output to the output device.

Subsequently, with reference to FIG. 5A to FIG. 5E, a description is made of processing of the calculation count determination module 311 for determining the calculation-enabled count of an index based on the current size of the queue 305 and the processing time information 316 in the stream data processing according to this embodiment.

Figure 5E:
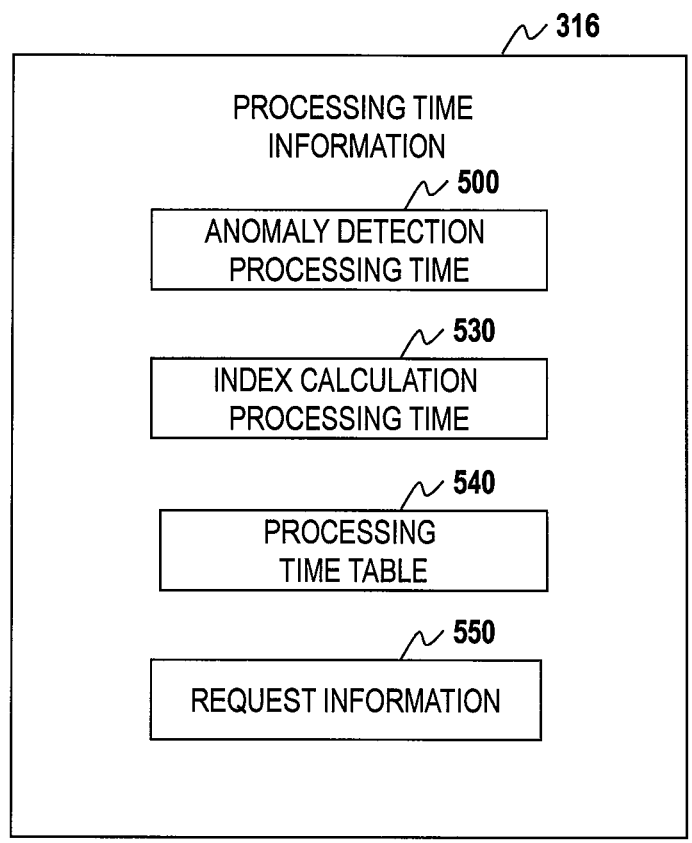
FIG. 5E is a block diagram illustrating an example of the processing time information of the index information storing module according to the first embodiment of this invention.

FIG. 5E is a block diagram illustrating an example of the processing time information 316 of the index information storing module 315 of the index calculation management module 310. The processing time information 316 includes: an anomaly detection processing time 500 for retaining a time period for anomaly detection processing; an index calculation processing time 530 for retaining a time period required to calculate the detection index 303; a processing time table 540 for retaining a relationship among the data amount, the processing time, and a calculation count of the detection index 303; and request information 550 for retaining a requested value of the processing time.

FIG. 5A is an example of the time 500 required for the processing of the anomaly detection module 302 for each data amount of the input data 108 per unit time. The anomaly detection processing time 500 has each entry formed of an input data amount 501 per unit time and a processing time 502 required for the anomaly detection module 302 to process the input data amount. The anomaly detection processing time 500 stores the data amount 501 and the processing time 502 for each data amount as shown in entries 511 to 515.

The anomaly detection processing time 500 stores the number 501 of pieces of input data 108 processed by the anomaly detection module 302 and the time period required for the anomaly detection processing in the processing time 502. Alternatively, a predetermined value may be set in the processing time 502 as an initial value for each data amount 501, or the processing time 502 may be set for each the data amount 501.

It should be noted that the processing time for the input data 108 is a difference between a time at which the input data 108 is received by the input data reception module 301 and a time at which the processing is finished by the anomaly detection module 302.

FIG. 5B is an example of the index calculation processing time 530 necessary to recalculate the detection index 303. The index calculation processing time 530 stores the arithmetic operation time 521 necessary to recalculate the detection index 303 for each index #520. In the figure, for example, in a case where the index #520 is "a", an arithmetic operation time is 3 msec. In the index calculation processing time 530, each of the index #520 and the arithmetic operation time 521 may be one or may be at least two. In the index calculation processing time 530, the time period taken when the index calculation module 314 actually recalculates the detection index 303 corresponding to the index #520 is stored in the arithmetic operation time 521. Alternatively, a predetermined value may be set in the arithmetic operation time 521 as an initial value for each index #520. Alternatively, in a case where a computer resource of the stream data processing server 100 can be dynamically changed, a predicted value of the time period required to recalculate the detection index 303 may be stored in the arithmetic operation time 521 depending on an amount of the computer resource.

FIG. 5C is the processing time table 540 obtained by calculating the entire processing time, which is taken when the detection index 303 (for example, "a") of the index #520 is calculated in the anomaly detection processing time 500, for each input data amount 501 and each of calculation counts "0" to "5" of the index #520. FIG. 5C shows an example in which the processing time table 540 stores a sum of a calculation time for the detection index 303 with the calculation count being 0 to 5 and the processing time 502 for the anomaly detection as the entire processing times 541 to 546. It should be noted that the calculation count of 0 to 5 is a value appropriately set depending on the amount of the input data 108 or performance of the stream data processing server 100, and is not limited to 0 to 5.

In FIG. 5C, the processing time 541 with the calculation count being 0 corresponds to a case where the detection index 303 is not calculated, and in this case, is equal to the processing time 502 required for the anomaly detection processing shown in FIG. 5A. The processing time 542 with the calculation count being 1 corresponds to a case where the detection index 303 ("a") is calculated once (3 msec), and in this case, is equal to a value obtained by adding the arithmetic operation time 521 of 3 msec required to calculate the detection index 303 to the processing time 502 required for the anomaly detection processing shown in FIG. 5A. The same applies to the processing times 543 to 546, and the processing time 546 with the calculation count being 5 corresponds to a case where the detection index 303 ("a") is calculated five times, and in this case, is equal to a value obtained by adding the arithmetic operation time 521 of 3 (msec)×5=15 (msec) required to calculate the detection index 303 to the processing time 502 required for the anomaly detection processing shown in FIG. 5A.

FIG. 5D is an example of the requested information 550 for setting a relationship between the data amount and the request processing time for the stream data processing including the anomaly detection and the recalculation of the detection index 303. The request information 550 includes a data amount 551 for storing the amount of the input data 108 and a request processing time 552 set as a time limit for processing the data amount. In this embodiment, a case where the request processing time 552 is received from the computer 101 or 102 by the input data reception module 301 with the data amount set to a predetermined value (for example, 10) is shown. The request processing time 552 can be input from the computer 101 or the like.

The figure shows an example in which, when the number of pieces of input data 108 is 10, the anomaly detection processing and the recalculation of the detection index 303 are to be completed within 8 msec set as the request processing time 552. It should be noted that the stream data processing system 206 subjects the request processing time in accordance with the actual data amount to the arithmetic operation based on a ratio between the data amount to be processed in actuality and the data amount 551. For example, if the amount of the input data 108 is 20, the request processing time 552 is set to 8×2=16 (msec). It should be noted that the example of inputting the request processing time 552 from the external computer 101 or the like is shown, but a preset time constraint may be set as the request processing time 552. Alternatively, in the case where the computer resource of the stream data processing server 100 can be dynamically changed, the request processing time may be dynamically changed depending on the amount of the computer resource.

Based on the respective pieces of information shown in FIG. 5A to FIG. 5D, the calculation count determination module 311 of the stream data processing system 206 determines the calculation count of the detection index 303 from the amount of the input data 108 and the request processing time 552. For example, if the amount of the input data 108 is 10 with the request processing time 552 being 8 msec, the calculation count determination module 311 refers to the processing time table 540 to acquire a maximum count corresponding to the entire processing times 541 to 546 being equal to or less than 8 msec in a row whose data amount 501 is 10. In the example of the processing time table 540 shown in FIG. 5C, a maximum value of the processing time equal to or less than 8 msec with the data amount 501 being 10 is "twice" corresponding to the processing time 543 of 7 msec, and hence the calculation count determination module 311 determines a maximum calculation count $m_{max}$ of the detection index 303 as "twice".

Subsequently, with reference to FIG. 6 to FIG. 8, a description is made of processing of the recalculation criterion determination module 312 for determining a criterion for determining the recalculation of the detection index 303 based on the amount of the input data 108, the maximum calculation count $m_{max}$ of the detection index 303, and the degree of discrepancy 317.

Figures 6, 7:
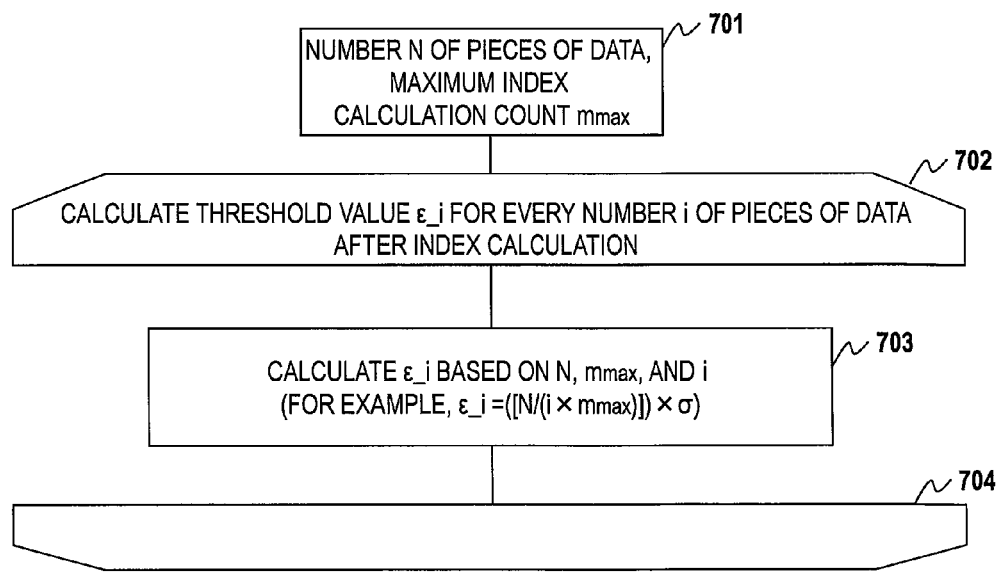
FIG. 6 is an example of the degree of discrepancy being the statistical information on the distance of the data that arrives after the calculation of the detection index according to the first embodiment of this invention.
FIG. 7 is a flowchart in which the recalculation criterion determination module derives the recalculation criterion according to the first embodiment of this invention.

FIG. 6 is an example of the degree of discrepancy 317 being the statistical information on the distance of the data that arrives after the calculation of the detection index 303. The degree of discrepancy 317 has entries 611 to 615 each formed of a number i of pieces of data 601 received after the calculation of the detection index 303 and a dispersion σ 602 of a magnitude of a vector obtained by summing up values of vectors from the mean value of data being the detection index 303 to the pieces of arrived data. In the example of FIG. 6, instead of creating an entry for every number i of pieces of data, entries may be integrated into one if the number i of pieces of data is equal to or larger than a preset value of 5 (615). It should be noted that the degree of discrepancy 317 is calculated by the recalculation criterion determination module 312.

Next, FIG. 7 is a flowchart in which the recalculation criterion determination module 312 derives the recalculation criterion. First, the recalculation criterion determination module 312 receives a number N of pieces of input data and the maximum calculation count $m_{max}$ from the calculation count determination module 311 (701). As described above, the maximum calculation count $m_{max}$ is a maximum calculation count of the detection index 303 retrieved by the calculation count determination module 311 from the processing time table 540 by using the request processing time 552. Further, the number N of pieces of input data is the number of pieces of input data 108 that are stored in the queue 305 and have not been subjected to the processing of the anomaly detection module 302, or the amount (byte count name or the like) thereof.

Subsequently, the recalculation criterion determination module 312 calculates a threshold value ϵ_i by repeating the processing of Steps 702 to 704 up to the number i of pieces of data (601) of the degree of discrepancy 317. In other words, the processing is repeated by the number of entries of the degree of discrepancy 317.

In Step 703, the recalculation criterion determination module 312 calculates a constant, by which the dispersion σ(611 to 615) of the degree of discrepancy 317 is multiplied, for each number i of pieces of data after the calculation of the detection index from the number N of pieces of input data and the maximum calculation count $m_{max}$ based on a relationship expressed by the following expression (703). This constant may be calculated by a simple expression such as [N/(i× $m_{max}$)], or another expression may be used.

Then, the recalculation criterion determination module 312 calculates the threshold value ϵ_i for each number i of pieces of data by the following expression (1).

$$\epsilon\_i = ([N/(i \times m_{max})]) \times \sigma \quad (1)$$

In accordance with the above-mentioned procedure, the threshold value ϵ_i to be the criterion for recalculating the detection index 303 is calculated for every number i of pieces of data of the degree of discrepancy 317.

The flowchart of FIG. 7 is repeated until the recalculation criterion determination module 312 has finished the arithmetic operation of the above-mentioned expression (1) for all the entries of the degree of discrepancy 317.

Figure 8:
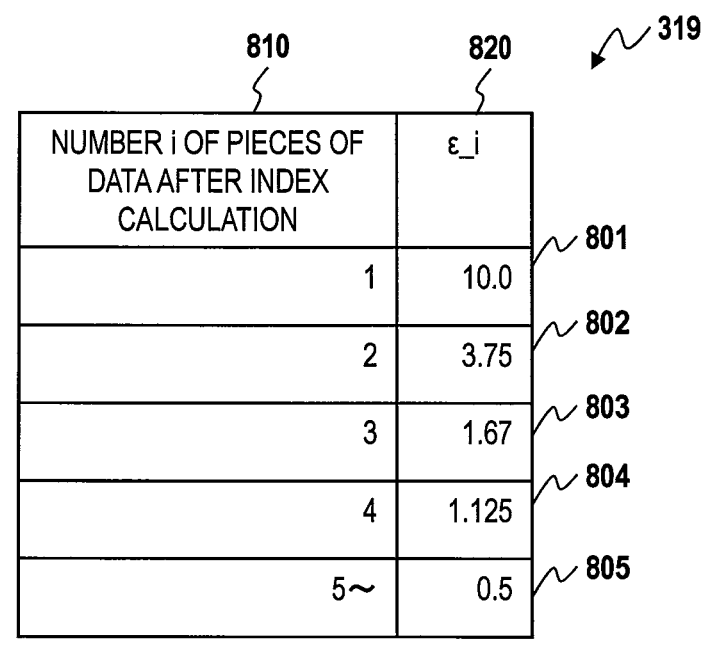

FIG. 8 is an example of a recalculation criterion 319 calculated in the processing of FIG. 7. The recalculation criterion 319 has each entry formed of a number i of pieces of data 810 being the same as that of the degree of discrepancy 317 and a threshold value ϵ_i 820 for each number i of pieces of data. FIG. 8 shows an example in which the criterion is derived by the expression of [N/(i×$m_{max}$)] where N=10 and $m_{max}$=2. The recalculation criterion determination module 312 calculates the threshold value ϵ_i being the recalculation criterion for each number i of pieces of data after the calculation of the detection index as shown in entries 801 to 805. It should be noted that the recalculation criterion 319 is retained in the memory 202 in advance.

Figure 9:
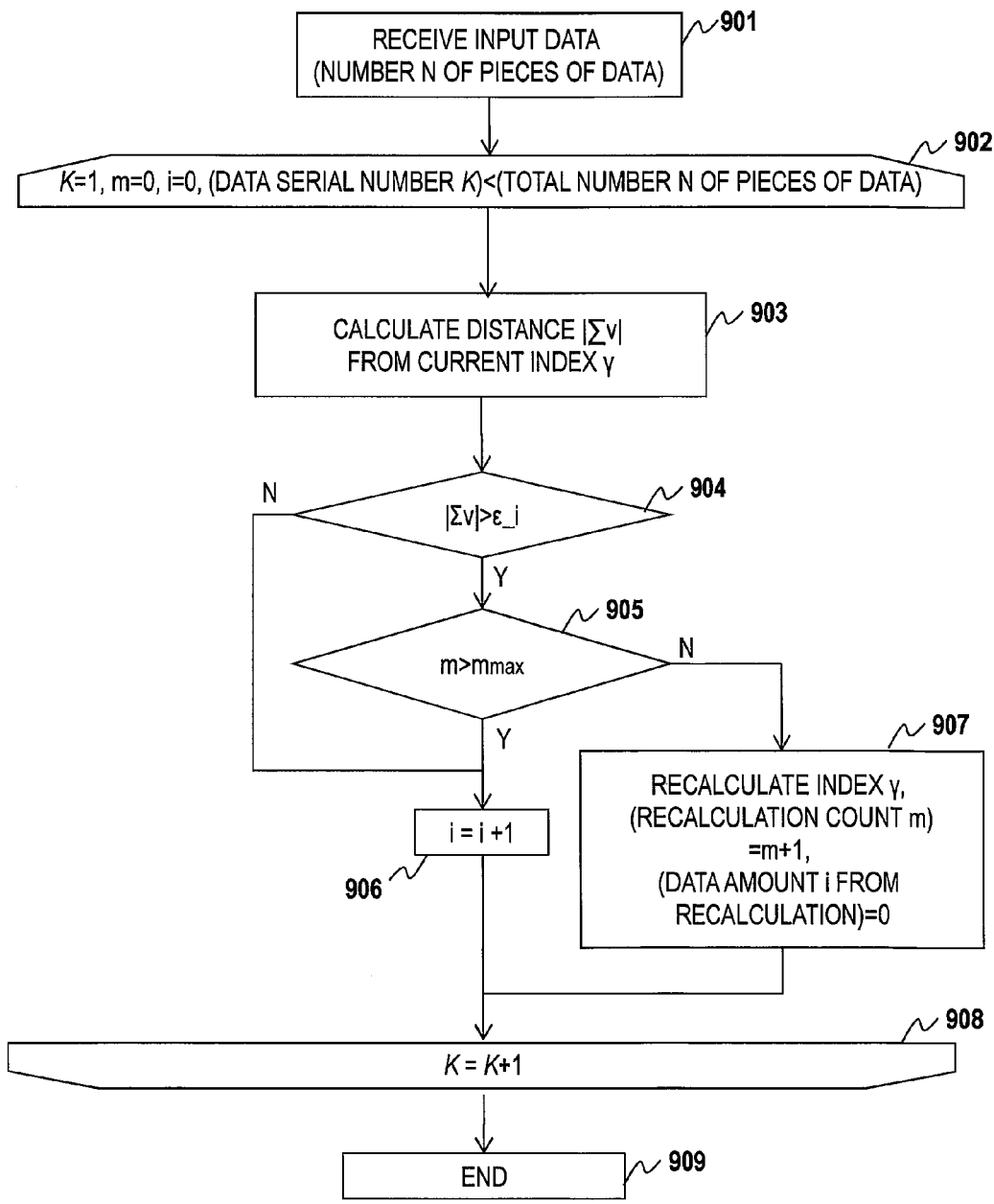
FIG. 9 is a flowchart illustrating an example of the processing for determination of the recalculation of the detection index according to the first embodiment of this invention.

FIG. 9 is a flowchart illustrating an example of the processing for determination of the recalculation of the detection index 303 and for the recalculation, which is performed by the index calculation determination module 313 and the index calculation module 314 of the stream data processing system 206 according to this embodiment.

First of all, the index calculation determination module 313 receives N pieces of input data 108 (901). Subsequently, in Step 902, the index calculation determination module 313 sets a data amount i received after the calculation of the previous detection index 303 to 0 and a recalculation count m of the detection index 303 to 0, and repeats the following Steps 903 to 907 for all data serial numbers K=1 to N (902 and 908).

First, the index calculation determination module 313 adds data on the data serial number K, and then calculates the distance |Σv| between the detection index 303 (γ) currently in use and all the pieces of data received after the calculation of the previous detection index γ(903). The distance mentioned here may be set as a length having a value obtained by calculating all the vectors connecting between the mean value of the input data 108 serving as the detection index 303 and the individual pieces of data and summing up all the vector values, or may be calculated by another method.

In Step 904, the index calculation determination module 313 determines whether or not the calculated distance |Σv| of all the pieces of data is larger than the threshold value ∈_i being the recalculation criterion. If the distance |Σv| of all the pieces of data is larger than the threshold value ∈_i, the procedure advances to Step 905. On the other hand, if the distance |Σv| of all the pieces of data is equal to or smaller than the threshold value ∈_i, the procedure advances to Step 906.

In Step 906 in which the calculated distance |Σv| of the data is larger than the threshold value ∈_i, the index calculation determination module 313 adds 1 to the data amount i after the recalculation of the detection index 303, and moves on to the processing for the subsequent piece of data.

On the other hand, if the calculated |Σv| is equal to or smaller than the threshold value ∈_i, the index calculation determination module 313 determines whether or not the recalculation count m is larger than the maximum calculation count $m_{max}$ (905). If the recalculation count m is larger than the maximum calculation count $m_{max}$, in Step 906, the index calculation determination module 313 adds 1 to the data amount i after the recalculation of the detection index 303, and then moves on to the processing for the subsequent piece of data.

On the other hand, if the recalculation count m is equal to or smaller than the maximum calculation count $m_{max}$, in Step 907, the index calculation determination module 313 instructs the index calculation module 314 to recalculate the detection index 303. The index calculation module 314 recalculates a new detection index 303 (γ), adds 1 to the recalculation count m, and advances to the processing for the subsequent piece of data by setting the data amount i after the recalculation to 0 (907). After finishing the above-mentioned processing for all the N pieces of data, the index calculation determination module 313 brings the processing to an end (909).

Next, with reference to FIG. 10A and FIG. 10B, a description is made of examples of a recalculation determination result of the detection index 303 for the input data 108 and the output detection index 303. FIG. 10A and FIG. 10B show examples in which the number N of pieces of data is 10, the maximum calculation count $m_{max}$ is 2, and the values shown in FIG. 8 are given as the threshold value ∈_i being the recalculation criterion.

FIG. 10A is an example of the input data 108. In this example, the input data 108 has each entry formed of a number i of pieces of data 1001, a value 1002 on the X-axis, and a value 1003 on the Y-axis, and 10 pieces of data corresponding to entries 1010 to 1019 form the input data 108.

FIG. 10B shows the determination result of the recalculation, the detection index 303, and a midway result thereof that are output as a result that the index calculation determination module 313 and the index calculation module 314 perform the processing of FIG. 9 for the input data 108.

FIG. 10B includes a serial number #1100 of data for calculating the distance |Σv|, a distance 1101 of the data 108 from the detection index 303 on the X-axis, a distance 1102 thereof from the detection index 303 on the Y-axis, a total sum 1103 of the distances of all the pieces of data after the recalculation of the detection index 303 from the detection index on the X-axis, a total sum 1104 of the distances thereof from the detection index on the Y-axis, a calculated distance |Σv| 1105, a recalculation determination result 1106 determined from the threshold value ∈_i being the recalculation criterion and the maximum calculation count $m_{max}$, a value 1107 on the X-axis of the recalculated detection index, and a value 1108 on the Y-axis of the detection index. In FIG. 10B, in correspondence with the entries 1010 to 1019 in FIG. 10A, 10 results corresponding to entries 1110 to 1119 are output.

For example, with respect to the entry 1010 (i=1, x=2.8, and y=4.9) of the input data illustrated in FIG. 10A, the values of the detection index 303 at that time point correspond to the entry 1110 in FIG. 10B, in which the value 1107 on the X-axis is x=3.0 and the value 1108 on the Y-axis is y=5.0. Therefore, with respect to the input data 108 of the entry 1010 in FIG. 10A, the distance 1101 on the X-axis and the distance 1102 on the Y-axis from the detection index 303 of the entry 1110 in FIG. 10B are −0.2 and −0.1, respectively. Because the entry is obtained immediately after the recalculation, the total sum 1103 of the distances of all the pieces of data after the recalculation from the index on the X-axis and the total sum 1104 of the distances thereof from the index on the Y-axis are −0.2 and −0.1, respectively, as they are. As a result, the distance |Σv| 1105 is 0.22.

In this case, because K=1 due to the first piece of data after the recalculation, the threshold value ∈_1 is 10.0 in the entry 801 in FIG. 8, and hence it is determined that the recalculation is unnecessary, to use the values of the index x=3.0 and y=5.0 for the subsequent piece of data as they are. In FIG. 10A, the entry 1011 corresponding to the subsequent piece of input data has x=0.2 and y=1.1, and hence, as shown in the entry 1111 in FIG. 10B, the distance 1101 from the detection index on the X-axis and the distance 1102 from the detection index on the Y-axis are −2.8 and −3.9, respectively. The values of the entry 1111 are added to those of the data corresponding to the previous entry 1110, and the total sum 1103 of the distances of all the pieces of data after the recalculation from the index on the X-axis and the total sum 1104 of the distances thereof from the index on the Y-axis are −3.0 and −4.0, respectively. As a result, the distance |Σv| 1105 of the entry 1111 is 5.00. This value is larger than the threshold value ∈_2=3.75 of the entry 802 in FIG. 8 being ∈_2, and hence the index calculation determination module 313 determines that it is necessary to recalculate the detection index 303. As a result, the index calculation module 314 calculates x=2.7 and y=4.6 as a new detection index 303, to process the subsequent piece of data. After the processing for the input data 108 is thus continued, when the entry 1018 being the ninth piece of data in FIG. 10A is processed, the distance |Σv| 1105 of the entry 1118 in FIG. 10B is 1.02. This value is larger than the threshold value 0.5 of the entry 805 being ∈_5 in FIG. 8, but the detection index 303 has been recalculated twice already in the entry 1111 being a processing result of the second piece of data and the entry 1113 being the processing result of the fourth piece of data, and hence it is determined that no more calculation cannot be performed.

By using the detection index 303 obtained in accordance with the above-mentioned procedure, the anomaly detection module 302 performs the anomaly detection for the input data 108.

According to the stream data processing system of the first embodiment described above in detail, based on the data amount of the input data 108 received by the stream data processing server 100, it is possible to determine a recalculation count of the detection index 303 and the recalculation criterion therefore and recalculate the index for the anomaly detection at an appropriate timing, and it is possible to perform the anomaly detection with high accuracy while securing a real-time property of the stream data processing system 206.

Second Embodiment

Next, as a second embodiment, a description is made of a stream data processing system that uses a past index in a case where the detection index 303 cannot be recalculated. It should be noted that in the description of the second embodiment, the same description of the configuration or processing as that of the first embodiment is omitted. The configuration of a computer environment in which the stream data processing server 100 according to the second embodiment is used and the configuration of the stream data processing server are the same as those of FIG. 1 and FIG. 2, and hence descriptions thereof are omitted here.

Figure 11:
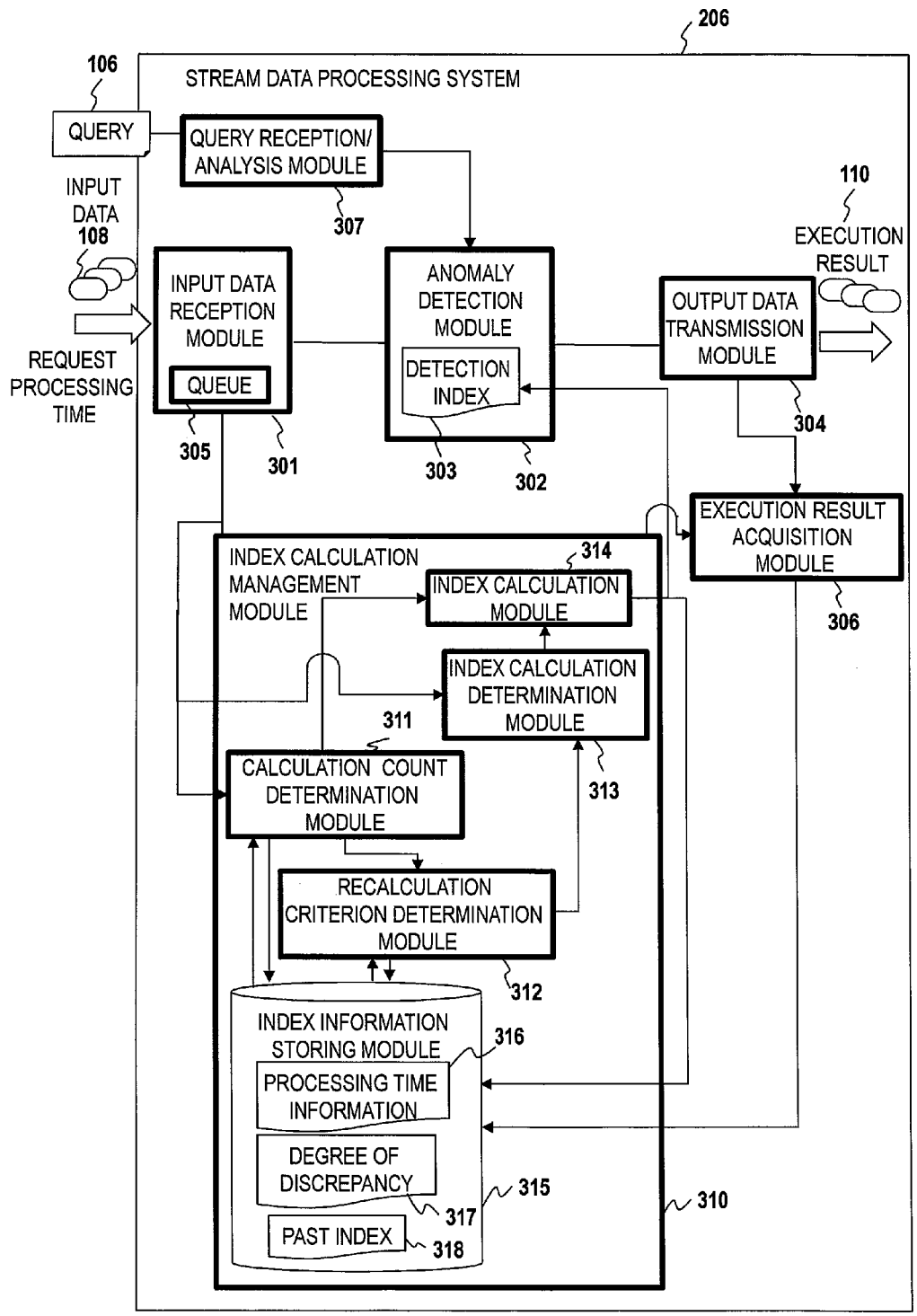
FIG. 11 is a diagram illustrating a functional block configuration of the software for executing the anomaly detection processing for the stream data processing system according to a second embodiment of this invention.

FIG. 11 is a diagram illustrating a functional block configuration of the software for executing the anomaly detection processing for the stream data processing system 206 according to the second embodiment. In FIG. 11, the components denoted by reference numerals 301 to 307, 311, 312, 314, 316, and 317 are the same as those of the first embodiment described with reference to FIG. 3, and hence descriptions thereof are omitted here. In the second embodiment, in addition thereto, the detection index 303 calculated by the index information storing module 315 in the past is retained as a past index 318. Further, in addition to the function described in the first embodiment, the index calculation determination module 313 has a function of evaluating the distance |Σv| also for the past index 318 if it is determined that the recalculation is necessary after a maximum recalculation count of the detection index is exceeded, and when an index having a smaller distance |Σv| than the detection index 303 in use is found, employing the index as the detection index 303.

Figure 12:
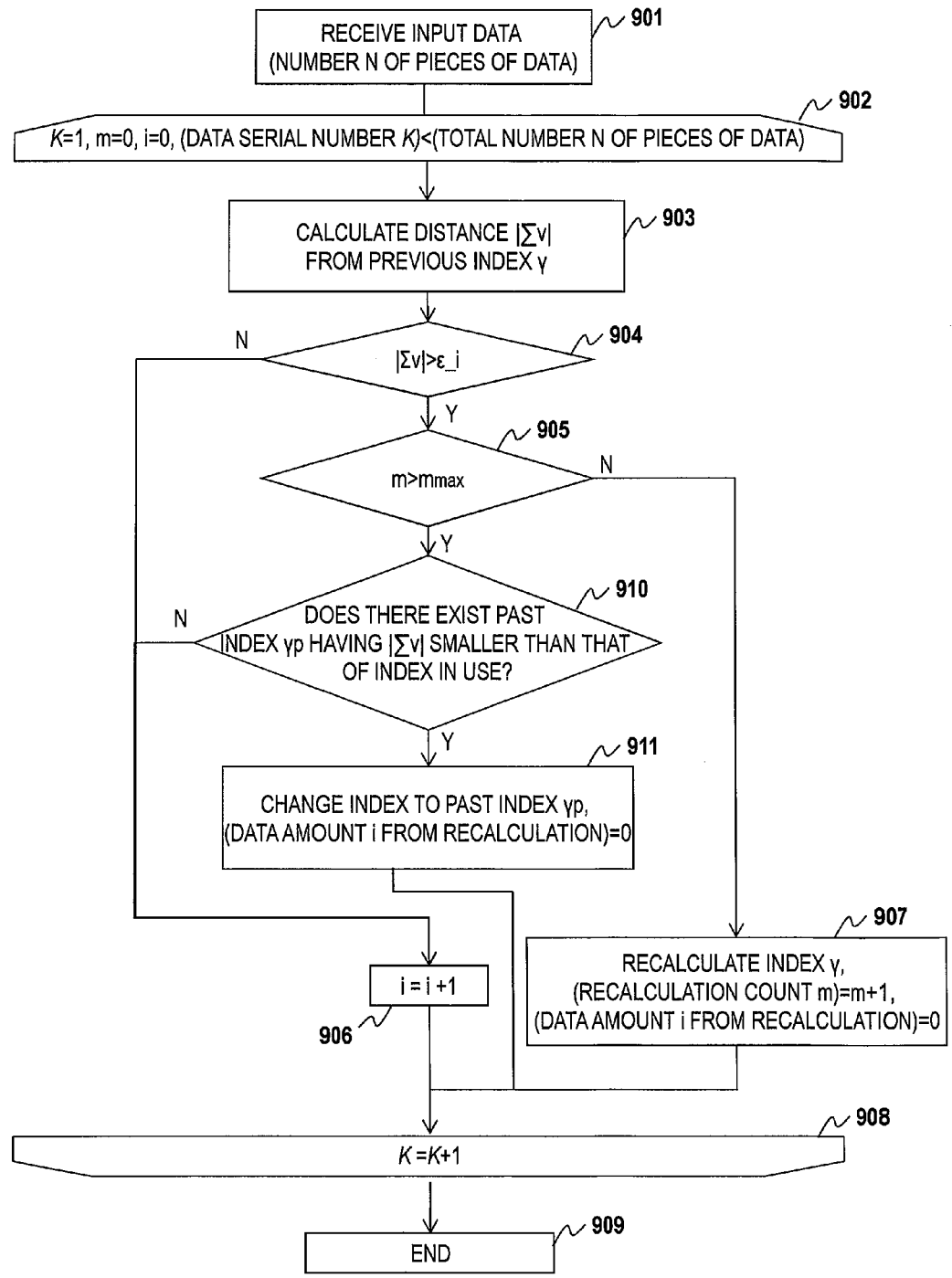
FIG. 12 is a flowchart illustrating processing for determination of the recalculation of the detection index and for the recalculation according to a second embodiment of this invention.

Next, FIG. 12 is a flowchart illustrating processing for determination of the recalculation of the detection index and for the recalculation, which is performed by the index calculation determination module 313 and the index calculation module 314 of the stream data processing system 206 according to this embodiment. In FIG. 12, Steps 901 to 904 and 906 to 909 are the same as those of the first embodiment described with reference to FIG. 9, and hence descriptions thereof are omitted.

In Step 905, if the recalculation count m is larger than the maximum calculation count $m_{max}$, the index calculation determination module 313 acquires a past index from the past index 318 in Step 910. Then, the index calculation determination module 313 evaluates the distance |Σv| of each past index 318 from the input data 108. The index calculation determination module 313 determines whether or not there exists a value (past index $γ_p$) smaller than the distance |Σv| of the current detection index 303 among the evaluated distances. If there is no value smaller than the distance |Σv| of the current detection index 303 (N in 910), the index calculation determination module 313 adds 1 to the data amount i after the recalculation (906), and advances to the processing for the subsequent piece of data.

On the other hand, if there is a past index $γ_p$ smaller than the distance |Σv| of the current detection index 303 (Y in 910), the index calculation determination module 313 changes the detection index 303 to this past index $γ_p$, and advances to the processing for the subsequent piece of data by setting the data amount i after the recalculation to 0 (911).

FIG. 13A is an example of the past index 318. The past index 318 has each entry formed of an index #3181 for storing an identifier of the detection index, Xave 3182 being the value on the X-axis of the detection index, and Yave 3183 being the value on the Y-axis of the detection index. In the example shown in the figure, entries 1301 to 1306 are recorded.

Here, it is assumed that FIG. 10A shown in the first embodiment is given as the input data 108, the number N of pieces of data is 10 with the maximum calculation count $m_{max}$ being 2, and the value of the first embodiment shown in FIG. 8 is given as a recalculation criterion $ε\_i$. Entries 1110 to 1117, 1120, and 1121 shown in FIG. 14 indicate the determination result of the recalculation, the detection index 303, and the midway result thereof that are output as a result that the index calculation determination module 313 and the index calculation module 314 perform the processing of FIG. 12 in the same condition as that of the first embodiment. FIG. 14 shows the determination result of the recalculation, the detection index 303, and the midway result thereof in the same manner as FIG. 10B.

In FIG. 14, the first to eighth entries 1110 to 1117 are the same as those described with reference to FIG. 10B, and hence descriptions thereof are omitted. In FIG. 10A, when the entry 1018 corresponding to the ninth piece of data is processed, the distance |Σv| 1105 of the entry 1120 corresponding thereto in FIG. 14 is 1.02. This |Σv| is larger than 0.5 being the threshold value $ε\_5$ of the entry 805 shown in FIG. 8. Here, with regard to the recalculation of the detection index 303, in FIG. 14, the recalculation has been performed twice in the entry 1111 being the processing result of the second piece of data and the entry 1113 being the processing result of the fourth piece of data, and hence it is determined that no further recalculation can be performed.

Therefore, as a result of performing the processing for calculating the distance |Σv| for each of the entries 1301 to 1306 of the past index 318, entries 1311 to 1316 in FIG. 13B are obtained. In FIG. 13B, a distance |Σv| 3184 from the input data 108 is obtained for each of the entries 1301 to 1306 of the past index 318 in FIG. 13A, and the entries 1311 to 1316 correspond to the entries 1301 to 1306, respectively, in FIG. 13A. At this time, the distance |Σv| from the past index (4) of the entry 1304 in FIG. 13A is 0.58 in the entry 1314, which is smaller than the distance |Σv| from the current index being 1.02 (entry 1120 in FIG. 14), and hence x=3.0 and y=5.0 being the values of the past index 318 are substituted for the detection index 303 (1120).

According to the stream data processing system 206 of the second embodiment described above in detail, based on the data amount received by the stream data processing server 100, it is possible to determine an index recalculation count of the detection index and the recalculation criterion therefore and recalculate the index and use the past index at an appropriate timing, and it is possible to perform the anomaly detection with higher accuracy while securing the real-time property.

The different kinds of embodiment of this invention have been described above, but this invention is not limited to those embodiments, and it should be understood that various modified examples can be included. The above-mentioned embodiments have been described for better understandings of this invention, and this invention is not limited thereto. Further, it should be understood that the components, functions, processing, and the like of each of the above-mentioned embodiments can be realized not only as a software configuration formed mainly of a part or entirety thereof but also as a dedicated hardware configuration or a configuration combining those.

This invention can be applied to a stream data processing system, a stream data processing device, and a stream data processing method that are provided in order to guarantee latency.

What is claimed is:

1. A stream data anomaly detection method, for detecting an anomaly from input data received by an interface on a computer,
the computer comprising:
   a processor;
   a memory;
   the interface;
   an input module for receiving the input data;
   an anomaly detection module for detecting the anomaly from the input data; and
   an index management module for managing an index for detecting the anomaly from the input data,
the anomaly detection method for stream data comprising:
   a first step of receiving, by the input module, the input data received by the interface;
   a second step of comparing, by the anomaly detection module, the received input data with the index, and when a difference between a value of the input data and the index satisfies a predetermined condition, detecting the anomaly from the input data; and
   a third step of determining, by the index management module, whether to recalculate the index,
the third step comprising:
   a fifth step of calculating a maximum count of the recalculation of the index based on an amount of unprocessed input data that is yet to be processed by the anomaly detection module among pieces of input data received by the input module, an arithmetic operation time required for the recalculation of the index, and a time constraint set in advance;
   a sixth step of calculating a predetermined threshold value for each piece of input data received after the previous calculation of the index;
   a seventh step of calculating the difference between the value of the input data and the index;
   an eighth step of comparing the difference with the predetermined threshold value that corresponds to the piece of input data, determining that the index is to be recalculated when the difference is greater than the predetermined threshold value, and executing processing for executing the recalculation of the index until the maximum count of the recalculation is reached, when the index is determined to be recalculated; and
   a ninth step of substituting the index with the recalculated new index.

2. The stream data anomaly detection method according to claim 1, wherein the fifth step comprises setting in advance a processing time required for processing performed by the anomaly detection module for each amount of the unprocessed input data that is yet to be processed by the anomaly detection module, and calculating such a maximum count of the recalculation that a sum of the processing time corresponding to the amount of the unprocessed input data and the arithmetic operation time required for the recalculation of the index falls within the time constraint set in advance.

3. The stream data anomaly detection method according to claim 1, wherein:
   the sixth step comprises determining, based on the maximum count of the recalculation, the predetermined threshold value for each of pieces of input data received after the recalculation of the index as a determination criterion for recalculating the index;
   the seventh step comprises calculating a distance between the value of the input data and the index as the difference, and calculating a total sum of the distances in order until the number of pieces of unprocessed input data is reached; and
   the eighth step comprises comparing the total sum of distances with the predetermined threshold value corresponding to the number of pieces of input data each time the total sum of distances between the value of the input data and the index is calculated in order in the seventh step, and determining that the predetermined threshold value is to be recalculated when the total sum of distances is larger than the predetermined threshold value.

4. The stream data anomaly detection method according to claim 1, further comprising a tenth step of accumulating, by the index management module, a past index when the index is substituted,
   wherein the eighth step comprises setting, as the new index, the past index having the difference smaller than that of the current index after executing the processing for executing the recalculation of the index until the maximum count of the recalculation is reached.

5. The stream data anomaly detection method according to claim 1, wherein:
   the input module comprises a queue for retaining the input data; and
   the third step comprises acquiring the amount of the input data based on a size of the queue containing the unprocessed input data.

6. A stream data anomaly detection device, for detecting an anomaly from input data received by an interface, the anomaly detection device for stream data comprising a computer,
   the computer comprising:
      a processor;
      a memory;
      the interface;
      an input module for receiving the input data;
      an anomaly detection module for detecting the anomaly from the input data; and
      an index management module for calculating an index for detecting the anomaly from the input data,
   the input module being configured to receive the input data received by the interface,
   the anomaly detection module being configured to compare the input data received by the input module with the index, and when a difference between a value of the input data and the index satisfies a predetermined condition, detect the anomaly from the input data,
   the index management module comprising:
      an index calculation determination module for determining whether to recalculate the index,
   the index calculation determination module being configured to:
      calculate a maximum count of the recalculation of the index based on an amount of unprocessed input data that is yet to be processed by the anomaly detection module among pieces of input data received by the input module, an arithmetic operation time required for the recalculation of the index, and a time constraint set in advance;
      calculate a predetermined threshold value corresponding for each piece of input data received after the previous calculation of the index;

calculate the difference between the value of the input data and the index;

compare the difference with the predetermined threshold value that corresponds to the piece of input data, determine that the index is to be recalculated when the difference is greater than the predetermined threshold value, and execute processing for executing the recalculation of the index until the maximum count of the recalculation is reached, when the index is determined to be recalculated; and substitute the index with the recalculated new index.

7. The stream data anomaly detection device according to claim 6, wherein the index calculation determination module is further configured to set in advance a processing time required for processing performed by the anomaly detection module for each amount of the unprocessed input data that is yet to be processed by the anomaly detection module, and calculate such a maximum count of the recalculation that a sum of the processing time corresponding to the amount of the unprocessed input data and the arithmetic operation time required for the recalculation of the index falls within the time constraint set in advance.

8. The stream data anomaly detection device according to claim 6, wherein the index calculation determination module is further configured to:

determine, based on the maximum count of the recalculation, the predetermined threshold value for each of the pieces of input data received after the recalculation of the index as a determination criterion for recalculating the index;

calculate a distance between the value of the input data and the index as the difference, and calculate a total sum of the distances in order until the number of pieces of unprocessed input data is reached; and compare the total sum of distances with the predetermined threshold value corresponding to the number of pieces of input data each time the total sum of distances between the value of the input data and the index is calculated in order, and determine that the predetermined threshold value is to be recalculated when the total sum of distances is larger than the predetermined threshold value.

9. The stream data anomaly detection device according to claim 6, wherein the index calculation module is configured to:

accumulate a past index; and set, as the new index, the past index having the difference smaller than that of the current index after executing the processing for executing the recalculation of the index until the maximum count of the recalculation is reached.

10. The stream data anomaly detection device according to claim 6, wherein:

the input module comprises a queue for retaining the input data; and the index calculation determination module is further configured to acquire the amount of the input data based on a size of the queue containing the unprocessed input data.

\* \* \* \* \*